United States Patent [19]

Yokono et al.

[11] Patent Number: 5,151,905
[45] Date of Patent: Sep. 29, 1992

[54] DATA RECORDING METHOD

[75] Inventors: Shigeru Yokono, Kanagawa; Minoru Tobita, Tokyo, both of Japan

[73] Assignee: Sony Corporation, Tokyo, Japan

[21] Appl. No.: 419,388

[22] Filed: Oct. 10, 1989

[30] Foreign Application Priority Data

Oct. 14, 1988 [JP] Japan .................. 63-259143

[51] Int. Cl.⁵ .................................. H03M 13/00
[52] U.S. Cl. .................. 371/39.1; 371/40.1; 371/38.1
[58] Field of Search .......... 371/39.1, 2.1, 40.1, 371/10.2, 40.4, 38.1

[56] References Cited

U.S. PATENT DOCUMENTS

| | | | |
|---|---|---|---|
| 3,652,998 | 3/1972 | Forney, Jr. ............... | 371/2.1 |
| 3,657,699 | 4/1972 | Rocher et al. ........... | 371/2.1 |
| 4,336,612 | 6/1982 | Inoue et al. ............. | 371/39.1 |
| 4,455,655 | 6/1984 | Galen et al. ............. | 371/40.1 |
| 4,564,945 | 1/1986 | Glover et al. ........... | 371/40.1 |
| 4,611,314 | 9/1986 | Ogata et al. ............. | 369/32 |
| 4,704,640 | 11/1987 | Okamoto et al. ....... | 371/38.1 |
| 4,730,321 | 3/1988 | Machado ................. | 371/38.1 |
| 4,864,572 | 9/1989 | Rechen et al. .......... | 371/2.1 |
| 4,914,655 | 4/1990 | Johannes et al. ........ | 371/40.1 |
| 4,949,342 | 8/1990 | Shimbo et al. .......... | 371/40.1 |
| 4,964,128 | 10/1991 | Sako et al. .............. | 371/39.1 |

FOREIGN PATENT DOCUMENTS

0155664A2 9/1985 European Pat. Off. .
0163481A2 12/1985 European Pat. Off. .
0258059A2 3/1988 European Pat. Off. .

Primary Examiner—Jerry Smith
Assistant Examiner—Ly V. Hua
Attorney, Agent, or Firm—Philip M. Shaw, Jr.

[57] ABSTRACT

A method for recording data onto a disc-shaped recording medium having a sector construction such as an optical disc by dividing input data into predetermined lengths, respectively, two-dimensionally arranging the divided data, generating and adding error correction codes to the two-dimensionally arranged data by a predetermined series to thereby form n encoded blocks; changing the data arrangement among the n encoded blocks; and distributing and recording the changed data to each sector on the disc-shaped recording medium.

7 Claims, 9 Drawing Sheets

| 4 COLUMNS R/W DIRECTION → | | | |
|---|---|---|---|
| D₁ 1 | D₁ 2 | D₁ 3 | D₁ 4 |
| D₁ 5 | D₁ 6 | D₁ 7 | D₁ 8 |
| D₁ 9 | D₁ 10 | D₁ 11 | D₁ 12 |
| D₁ 13 | D₁ 14 | D₁ 15 | D₁ 16 |
| D₁ 17 | D₁ 18 | D₁ 19 | D₁ 20 |
| D₁ 21 | D₁ 22 | D₁ 23 | D₁ 24 |
| D₁ 25 | D₁ 26 | D₁ 27 | D₁ 28 |
| D₁ 29 | D₁ 30 | D₁ 31 | D₁ 32 |
| D₁ 33 | D₁ 34 | D₁ 35 | D₁ 36 |
| ⋮ | ⋮ | ⋮ | ⋮ |
| D₁ 509 | D₁ 510 | D₁ 511 | D₁ 512 |
| P₁ 1 | P₁ 2 | P₁ 3 | P₁ 4 |
| CRC₁ 1 | CRC₁ 2 | CRC₁ 3 | CRC₁ 4 |
| E₁ 1,1 | E₁ 2,1 | E₁ 3,1 | E₁ 4,1 |
| E₁ 1,2 | E₁ 2,2 | E₁ 3,2 | E₁ 4,2 |
| ⋮ | ⋮ | ⋮ | ⋮ |
| E₁ 1,15 | E₁ 2,15 | E₁ 3,15 | E₁ 4,15 |
| E₁ 1,16 | E₁ 2,16 | E₁ 3,16 | E₁ 4,16 |

Left side labels: CONTROL DATA AND ERROR DETECTION CODES (2 ROWS); DATA (128 ROWS); PARITIES (16 ROWS)

Fig. 4B

| 4 COLUMNS R/W DIRECTION → | | | |
|---|---|---|---|
| D₂ 1 | D₂ 2 | D₂ 3 | D₂ 4 |
| D₂ 5 | D₂ 6 | D₂ 7 | D₂ 8 |
| D₂ 9 | D₂ 10 | D₂ 11 | D₂ 12 |
| D₂ 13 | D₂ 14 | D₂ 15 | D₂ 16 |
| D₂ 17 | D₂ 18 | D₂ 19 | D₂ 20 |
| D₂ 21 | D₂ 22 | D₂ 23 | D₂ 24 |
| D₂ 25 | D₂ 26 | D₂ 27 | D₂ 28 |
| D₂ 29 | D₂ 30 | D₂ 31 | D₂ 32 |
| D₂ 33 | D₂ 34 | D₂ 35 | D₂ 36 |
| ⋮ | ⋮ | ⋮ | ⋮ |
| D₂ 509 | D₂ 510 | D₂ 511 | D₂ 512 |
| P₂ 1 | P₂ 2 | P₂ 3 | P₂ 4 |
| CRC₁ 1 | CRC₁ 2 | CRC₁ 3 | CRC₁ 4 |
| E₂ 1,1 | E₂ 2,1 | E₂ 3,1 | E₂ 4,1 |
| E₂ 1,2 | E₂ 2,2 | E₂ 3,2 | E₂ 4,2 |
| ⋮ | ⋮ | ⋮ | ⋮ |
| E₂ 1,15 | E₂ 2,15 | E₂ 3,15 | E₂ 4,15 |
| E₂ 1,16 | E₂ 2,16 | E₂ 3,16 | E₂ 4,16 |

Left side labels: DATA (128 ROWS); CONTROL DATA AND EDC; PARITIES (16 ROWS)

Fig. 4C

4 COLUMNS
R/W DIRECTION →

CONTROL DATA AND EDC DATA (128 ROWS)

| $D_3$ 1 | $D_3$ 2 | $D_3$ 3 | $D_3$ 4 |
|---|---|---|---|
| $D_3$ 5 | $D_3$ 6 | $D_3$ 7 | $D_3$ 8 |
| $D_3$ 9 | $D_3$ 10 | $D_3$ 11 | $D_3$ 12 |
| $D_3$ 13 | $D_3$ 14 | $D_3$ 15 | $D_3$ 16 |
| $D_3$ 17 | $D_3$ 18 | $D_3$ 19 | $D_3$ 20 |
| $D_3$ 21 | $D_3$ 22 | $D_3$ 23 | $D_3$ 24 |
| $D_3$ 25 | $D_3$ 26 | $D_3$ 27 | $D_3$ 28 |
| $D_3$ 29 | $D_3$ 30 | $D_3$ 31 | $D_3$ 32 |
| $D_3$ 33 | $D_3$ 34 | $D_3$ 35 | $D_3$ 36 |
| ⋮ | ⋮ | ⋮ | ⋮ |
| $D_3$ 509 | $D_3$ 510 | $D_3$ 511 | $D_3$ 512 |
| $P_3$ 1 | $P_3$ 2 | $P_3$ 3 | $P_3$ 4 |
| $CRC_3$ 1 | $CRC_3$ 2 | $CRC_3$ 3 | $CRC_3$ 4 |

PARITIES (16 ROWS)

| $E_3$ 1,1 | $E_3$ 2,1 | $E_3$ 3,1 | $E_3$ 4,1 |
|---|---|---|---|
| $E_3$ 1,2 | $E_3$ 2,2 | $E_3$ 3,2 | $E_3$ 4,2 |
| ⋮ | ⋮ | ⋮ | ⋮ |
| $E_3$ 1,15 | $E_3$ 2,15 | $E_3$ 3,15 | $E_3$ 4,15 |
| $E_3$ 1,16 | $E_3$ 2,16 | $E_3$ 3,16 | $E_3$ 4,16 |

Fig. 4D

4 COLUMNS
R/W DIRECTION →

CONTROL DATA AND EDC DATA (128 ROWS)

| $D_4$ 1 | $D_4$ 2 | $D_4$ 3 | $D_4$ 4 |
|---|---|---|---|
| $D_4$ 5 | $D_4$ 6 | $D_4$ 7 | $D_4$ 8 |
| $D_4$ 9 | $D_4$ 10 | $D_4$ 11 | $D_4$ 12 |
| $D_4$ 13 | $D_4$ 14 | $D_4$ 15 | $D_4$ 16 |
| $D_4$ 17 | $D_4$ 18 | $D_4$ 19 | $D_4$ 20 |
| $D_4$ 21 | $D_4$ 22 | $D_4$ 23 | $D_4$ 24 |
| $D_4$ 25 | $D_4$ 26 | $D_4$ 27 | $D_4$ 28 |
| $D_4$ 29 | $D_4$ 30 | $D_4$ 31 | $D_4$ 32 |
| $D_4$ 33 | $D_4$ 34 | $D_4$ 35 | $D_4$ 36 |
| ⋮ | ⋮ | ⋮ | ⋮ |
| $D_4$ 509 | $D_4$ 510 | $D_4$ 511 | $D_4$ 512 |
| $P_4$ 1 | $P_4$ 2 | $P_4$ 3 | $P_4$ 4 |
| $CRC_4$ 1 | $CRC_4$ 2 | $CRC_4$ 3 | $CRC_4$ 4 |

PARITIES (16 ROWS)

| $E_4$ 1,1 | $E_4$ 2,1 | $E_4$ 3,1 | $E_4$ 4,1 |
|---|---|---|---|
| $E_4$ 1,2 | $E_4$ 2,2 | $E_4$ 3,2 | $E_4$ 4,2 |
| ⋮ | ⋮ | ⋮ | ⋮ |
| $E_4$ 1,15 | $E_4$ 2,15 | $E_4$ 3,15 | $E_4$ 4,15 |
| $E_4$ 1,16 | $E_4$ 2,16 | $E_4$ 3,16 | $E_4$ 4,16 |

Fig. 5A
PHYSICAL SECTOR S1
584 BYTES
$D_1,1|D_2,1|D_3,1|D_4,1|D_1,2|D_2,2|D_3,2|D_4,2|D_1,3|D_2,3|D_3,3|D_4,3$
$D_1,144|D_2,144|D_3,144|D_4,144|D_1,145|D_2,145|D_3,145|D_4,145|D_1,146|D_2,146|D_3,146|D_4,146$

Fig. 5B
PHYSICAL SECTOR S2
584 BYTES
$D_1,147|D_2,147|D_3,147|D_4,147|D_1,148|D_2,148|D_3,148|D_4,148|D_1,149|D_2,149|D_3,149|D_4,149$
$D_1,290|D_2,290|D_3,290|D_4,290|D_1,291|D_2,291|D_3,291|D_4,291|D_1,292|D_2,292|D_3,292|D_4,292$

Fig. 5C
PHYSICAL SECTOR S3
584 BYTES
$D_1,293|D_2,293|D_3,293|D_4,293|D_1,294|D_2,294|D_3,294|D_4,294|D_1,295|D_2,295|D_3,295|D_4,295$
$D_1,436|D_2,436|D_3,436|D_4,436|D_1,437|D_2,437|D_3,437|D_4,437|D_1,438|D_2,438|D_3,438|D_4,438$

Fig. 5D
PHYSICAL SECTOR S4
584 BYTES
$D_1,439|D_2,439|D_3,439|D_4,439|D_1,440|D_2,440|D_3,440|D_4,440|D_1,441|D_2,441|D_3,441|D_4,441$
$E_1,2,16|E_2,2,16|E_3,2,16|E_4,2,16|E_1,3,16|E_2,3,16|E_3,3,16|E_4,3,16|E_1,4,16|E_2,4,16|E_3,4,16|E_4,4,16$

| | | | |
|---|---|---|---|
| D₁ 1 | D₁ 2 | D₁ 3 | D₁ 4 |
| D₁ 5 | D₁ 6 | D₁ 7 | D₁ 8 |
| D₁ 9 | D₁ 10 | D₁ 11 | D₁ 12 |
| D₁ 13 | D₁ 14 | D₁ 15 | D₁ 16 |
| D₁ 17 | D₁ 18 | D₁ 19 | D₁ 20 |
| D₁ 21 | D₁ 22 | D₁ 23 | D₁ 24 |
| D₁ 25 | D₁ 26 | D₁ 27 | D₁ 28 |
| D₁ 29 | D₁ 30 | D₁ 31 | D₁ 32 |
| D₁ 33 | D₁ 34 | D₁ 35 | D₁ 36 |
| ⋮ | ⋮ | ⋮ | ⋮ |
| D₁ 509 | D₁ 510 | D₁ 511 | D₁ 512 |
| P₁ 1 | P₁ 2 | P₁ 3 | P₁ 4 |
| CRC₁ 1 | CRC₁ 2 | CRC₁ 3 | CRC₁ 4 |
| E₁ 1,1 | E₁ 2,1 | E₁ 3,1 | E₁ 4,1 |
| E₁ 1,2 | E₁ 2,2 | E₁ 3,2 | E₁ 4,2 |
| ⋮ | ⋮ | ⋮ | ⋮ |
| E₁ 1,15 | E₁ 2,15 | E₁ 3,15 | E₁ 4,15 |
| E₁ 1,16 | E₁ 2,16 | E₁ 3,16 | E₁ 4,16 |

Fig. 7B

| | | | |
|---|---|---|---|
| D₂ 1 | D₂ 2 | D₂ 3 | D₂ 4 |
| D₂ 5 | D₂ 6 | D₂ 7 | D₂ 8 |
| D₂ 9 | D₂ 10 | D₂ 11 | D₂ 12 |
| D₂ 13 | D₂ 14 | D₂ 15 | D₂ 16 |
| D₂ 17 | D₂ 18 | D₂ 19 | D₂ 20 |
| D₂ 21 | D₂ 22 | D₂ 23 | D₂ 24 |
| D₂ 25 | D₂ 26 | D₂ 27 | D₂ 28 |
| D₂ 29 | D₂ 30 | D₂ 31 | D₂ 32 |
| D₂ 33 | D₂ 34 | D₂ 35 | D₂ 36 |
| ⋮ | ⋮ | ⋮ | ⋮ |
| D₂ 509 | D₂ 510 | D₂ 511 | D₂ 512 |
| P₂ 1 | P₂ 2 | P₂ 3 | P₂ 4 |
| CRC₁ 1 | CRC₁ 2 | CRC₁ 3 | CRC₁ 4 |
| E₂ 1,1 | E₂ 2,1 | E₂ 3,1 | E₂ 4,1 |
| E₂ 1,2 | E₂ 2,2 | E₂ 3,2 | E₂ 4,2 |
| ⋮ | ⋮ | ⋮ | ⋮ |
| E₂ 1,15 | E₂ 2,15 | E₂ 3,15 | E/ |
| E₂ 1,16 | E₂ 2,16 | E₂ 3,16 | E₂ 4,16 |

Fig. 7C

| | | | |
|---|---|---|---|
| D₃ 1 | D₃ 2 | D₃ 3 | D₃ 4 |
| D₃ 5 | D₃ 6 | D₃ 7 | D₃ 8 |
| D₃ 9 | D₃ 10 | D₃ 11 | D₃ 12 |
| D₃ 13 | D₃ 14 | D₃ 15 | D₃ 16 |
| D₃ 17 | D₃ 18 | D₃ 19 | D₃ 20 |
| D₃ 21 | D₃ 22 | D₃ 23 | D₃ 24 |
| D₃ 25 | D₃ 26 | D₃ 27 | D₃ 28 |
| D₃ 29 | D₃ 30 | D₃ 31 | D₃ 32 |
| D₃ 33 | D₃ 34 | D₃ 35 | D₃ 36 |
| ⋮ | ⋮ | ⋮ | ⋮ |
| D₃ 509 | D₃ 510 | D₃ 511 | D₃ 512 |
| P₃ 1 | P₃ 2 | P₃ 3 | P₃ 4 |
| CRC₃ 1 | CRC₃ 2 | CRC₃ 3 | CRC₃ 4 |
| E₃ 1,1 | E₃ 2,1 | E₃ 3,1 | E₃ 4,1 |
| E₃ 1,2 | E₃ 2,2 | E₃ 3,2 | E₃ 4,2 |
| ⋮ | ⋮ | ⋮ | ⋮ |
| E₃ 1,15 | E₃ 2,15 | E₃ 3,15 | E₃ 4,15 |
| E₃ 1,16 | E₃ 2,16 | E₃ 3,16 | E₃ 4,16 |

Fig. 7D

| | | | |
|---|---|---|---|
| D₄ 1 | D₄ 2 | D₄ 3 | D₄ 4 |
| D₄ 5 | D₄ 6 | D₄ 7 | D₄ 8 |
| D₄ 9 | D₄ 10 | D₄ 11 | D₄ 12 |
| D₄ 13 | D₄ 14 | D₄ 15 | D₄ 16 |
| D₄ 17 | D₄ 18 | D₄ 19 | D₄ 20 |
| D₄ 21 | D₄ 22 | D₄ 23 | D₄ 24 |
| D₄ 25 | D₄ 26 | D₄ 27 | D₄ 28 |
| D₄ 29 | D₄ 30 | D₄ 31 | D₄ 32 |
| D₄ 33 | D₄ 34 | D₄ 35 | D₄ 36 |
| ⋮ | ⋮ | ⋮ | ⋮ |
| D₄ 509 | D₄ 510 | D₄ 511 | D₄ 512 |
| P₄ 1 | P₄ 2 | P₄ 3 | P₄ 4 |
| CRC₄ 1 | CRC₄ 2 | CRC₄ 3 | CRC₄ 4 |
| E₄ 1,1 | E₄ 2,1 | E₄ 3,1 | E₄ 4,1 |
| E₄ 1,2 | E₄ 2,2 | E₄ 3,2 | E₄ 4,2 |
| ⋮ | ⋮ | ⋮ | ⋮ |
| E₄ 1,15 | E₄ 2,15 | E₄ 3,15 | E₄ 4,15 |
| E₄ 1,16 | E₄ 2,16 | E₄ 3,16 | E₄ 4,16 |

Fig. 9A PHYSICAL SECTOR S1: $D_1 1 | D_1 2 | D_1 3 | D_1 4 | D_2 1 | D_2 2 | D_2 3 | D_2 4$

Fig. 9B PHYSICAL SECTOR S2: $D_1 5 | D_1 6 | D_1 7 | D_1 8 | D_2 5 | D_2 6 | D_2 7 | D_2 8$

Fig. 9C PHYSICAL SECTOR S3: $D_1 9 | D_1 10 | D_1 11 | D_1 12 | D_2 9 | D_2 10 | D_2 11 | D_2 12$

Fig. 9D PHYSICAL SECTOR S4: $D_1 13 | D_1 14 | D_1 15 | D_1 16 | D_2 13 | D_2 14 | D_2 15 | D_2 16$

DATA RECORDING METHOD

BACKGROUND OF THE INVENTION

1. Field of the Invention

The present invention relates to a data recording method which is suitable for use when data is recorded to, for instance, an optical disc.

2. Description of the Prior Art

The development of the WORM (Write Once, Read Many) type optical disc and the erasable and rewritable optical disc (for instance, magneto optical disc) has progressed. In such an optical disc, one track is divided into a plurality of sectors and data is recorded/reproduced on a sector unit basis. For instance, in the recording format for optical discs having a diameter of 5.25 inches, one track is divided into 17 sectors and data is recorded there.

In the conventional optical disc, in order to cope with a burst error or the like, the encoding of an error correction code is executed for every sector and a parity for error correction is generated and added.

For instance, among the recording formats of the optical discs having a diameter of 5.25 inches, there is a format which uses an LDC (long distance code) as an error correcting method. In the recording format using the LDC, for instance, control data and a CRC code for error detection are added to the user's data of 512 bytes, data is written into a buffer memory in the horizontal direction, error correction encoding is executed in which respective columns are used as an encoding series, and a parity of 16 bytes per series ($5 \times 16 = 80$ bytes per sector) is added. The data is read out in the horizontal direction and recorded into each sector on the optical disc.

As mentioned above, in the case of generating and adding a parity for error correction of 16 bytes to one series, the error correction can be executed for up to eight bytes per series. Data is arranged into five columns, the error correction code is added by using each column as an encoding series, and the reading/writing operations are executed in the horizontal direction, so that an interleave of five bytes is executed. Therefore, in this case, it is possible to cope with the generation of burst errors of up to $5 \times 8 = 40$ bytes. The defects of 40 bytes correspond to a length of about 300 μm at the innermost rim of the disc.

As mentioned above, in the case of an optical disc having a diameter of, for instance, 5.25 inches, it is possible to cope with burst errors corresponding to for instance, 40 bytes by the LDC. However, in the recording medium such as an optical disc on which data is recorded at a high density, it can happen that fairly large burst errors are generated. In such a case, the error correction cannot be executed by the LDC as mentioned above.

Therefore, when recording data onto an optical disc, a verification is made to see if errors equal to or exceeding a predetermined value have been generated in the sector into which data is to be recorded or not. The sector in which the errors of the predetermined value or more are generated is regarded as a defective sector. The data to be recorded into the defective sector is recorded into an alternate sector. In this manner, the alternate sector process as mentioned above is performed.

However, even if such an alternate sector process is executed, it is impossible to cope with large burst errors which are generated after data was recorded. If large burst errors are generated in the read only disc, the alternate sector process cannot be executed.

OBJECTS AND SUMMARY OF THE INVENTION

It is, therefore, an object of the present invention to provide a data recording method which can effectively execute error correction of large burst errors.

Another object of the invention is to provide a data recording method which can improve the correcting capability for large burst errors without largely changing the circuit and format.

In accordance with the present invention, the above objects are accomplished by a method for recording data onto a disc-shaped recording medium having a sector construction, comprising the steps of:

dividing input data into predetermined lengths, respectively two-dimensionally arranging the divided data, generating and adding error correction codes to the two-dimensionally arranged data by a predetermined series, thereby forming n encoded blocks, where n is an integer;

changing the data arrangement among the n encoded blocks; and distributing and recording the changed data to each sector on the disc-shaped recording medium.

In this invention the input data is stored into buffer memories and encoded by the LDC, respectively. The encoded data is controlled by a buffer memory access controller so that the interleave length becomes substantially long and is recorded into each sector on the disc. In the case where the input data is divided into, for instance, four encoding blocks and the data is rearranged among the four encoded blocks and is recorded, the interleave length is substantially increased four times as compared with that in the case where the data is not rearranged. Therefore, the error correcting capability for burst errors can be increased.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

A preferred embodiment of the present invention will be described hereinbelow with reference to the drawings.

Figure 1:
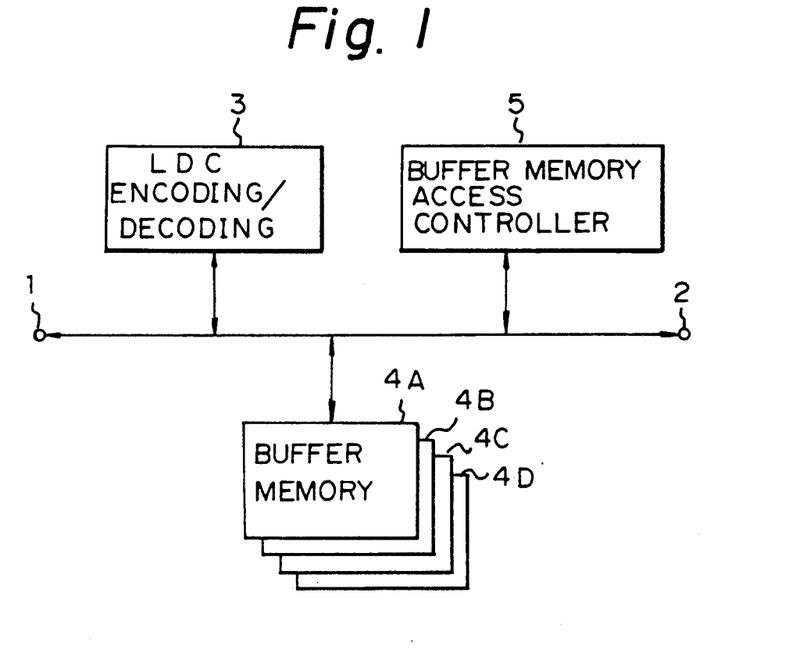
FIG. 1 is a functional block diagram which is used in explanation of a preferred embodiment of the present invention.

In FIG. 1, reference numeral 1 denotes an input/output terminal for recording or reproduction data; 2 indicates an input/output terminal for data which is recorded or reproduced onto or from a disc 6 (FIG. 2); 3 an encoding/decoding circuit to perform the encoding and decoding of an LDC (long distance code); 4A to 4D buffer memories; and 5 a buffer memory access controller.

When data is recorded onto the disc 6, input data from the input/output terminal 1 is stored once in the buffer memories 4A to 4D. A parity for error correction is generated and added to the input data which was two-dimensionally arranged and stored in the buffer memories 4A to 4D by using each column as an encoding series by means of the encoding/decoding circuit 3.

When reproducing data from the disc 6, the reproduced data of the disc 6 is received at the input/output terminal 2 and is stored once in the buffer memories 4A to 4D. The error correcting process of the reproduction data of the disc 6 stored in the buffer memories 4A to 4D is executed by the encoding/decoding circuit 3.

The buffer memory access controller 5 controls the read or write addresses in the buffer memories 4A to 4D.

Figure 2:
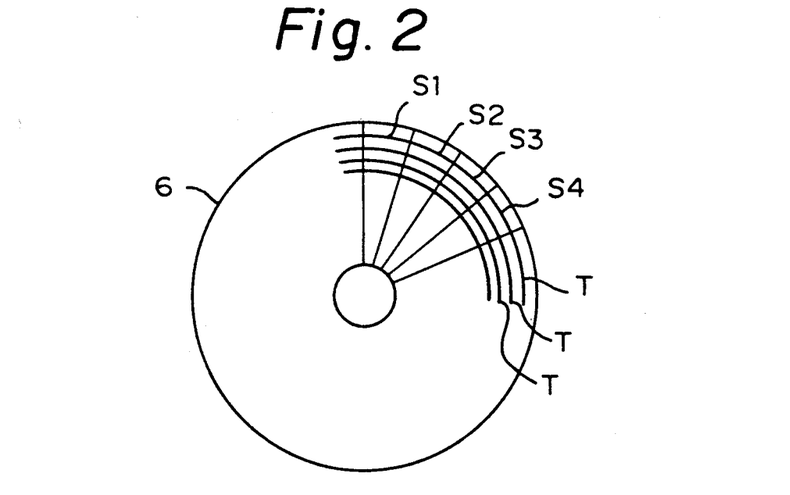
FIG. 2 is a plan view showing the data arrangement of a disc for use in the embodiment of the invention depicted in FIG. 1.

An erasable and rewritable optical disc, for instance, a magneto-optical disc is used as the disc 6. As shown in FIG. 2, spiral or annular tracks T are formed on the disc 6. Each of the tracks T is divided into a plurality of physical sectors $S_1, S_2, S_3, S_4, \ldots$ and data is recorded there.

The invention can be also similarly applied to a WORM type optical disc and a read only optical disc. In addition, the invention can be also likewise applied to a magnetic disc such as a hard disc or the like.

First, the operation in the case of recording data onto the disc 6 will be described with reference to the flowchart shown in FIG. 3.

The data to be recorded onto the disc 6 is input at the input terminal 1. Input data of 512 bytes from data $D_1$ 1 to $D_1$ 512 is sequentially stored into the buffer memory 4A in the horizontal direction. 512 bytes of subsequent data $D_2$ 1 to $D_2$ 512 is sequentially stored into the buffer memory 4B in the horizontal direction. Subsequently, input data of 512 bytes, $D_3$ 1 to $D_3$ 512, is sequentially stored into the buffer memory 4C in the horizontal direction. Lastly, 512 bytes of subsequent data $D_4$ 1 to $D_4$ 512 is sequentially stored into the buffer memory 4D in the horizontal direction (step 11).

The data stored into the buffer memories 4A to 4D is two-dimensionally arranged as shown in FIGS. 4A to 4D.

Figure 4A:
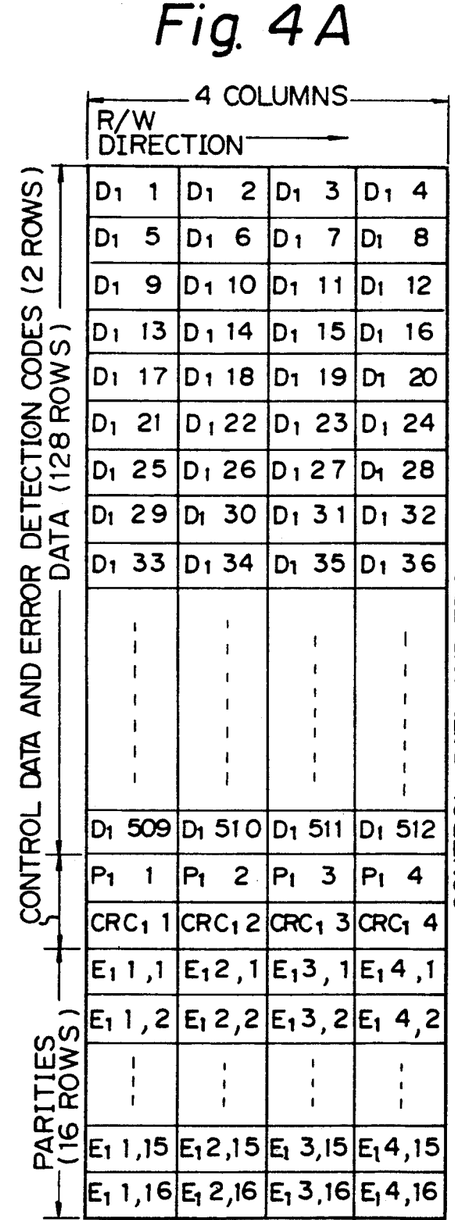
FIGS. 4A, 4B, 4C, and 4D are schematic diagrams which are used in explanation of the encoding blocks in the embodiment of the invention depicted in FIG. 1.

That is, as shown in FIG. 4A, the data $D_1$ 1 to $D_1$ 512 are two-dimensionally arranged in the buffer memory 4A into four columns and 128 rows. A row of control data $P_1$ 1 to $P_1$ 4 and a row of CRC codes $CRC_1$ 1 to $CRC_1$ 4 for error detection are added to these data.

Figure 4B:
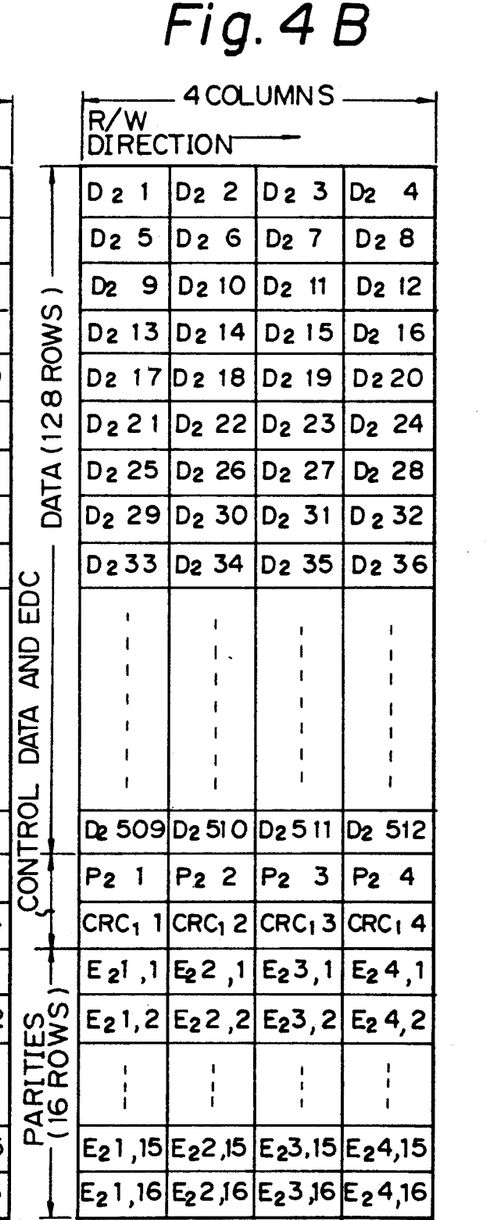

Similarly, as shown in FIG. 4B, the data $D_2$ 1 to $D_2$ 512 are two-dimensionally arranged in the buffer memory 4B in 128 rows and 4 columns. A row each of control data $P_2$ 1 to $P_2$ 4 and CRC codes $CRC_2$ 1 to $CRC_2$ 4 for error detection are added to these data.

Figure 4C:
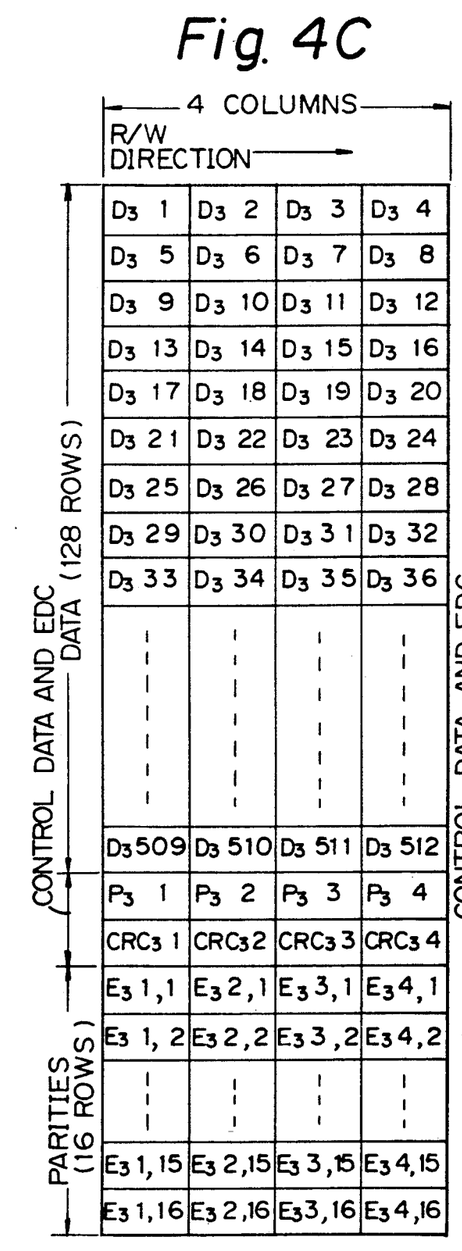

In FIG. 4C, the data $D_3$ 1 to $D_3$ 512 are likewise two-dimensionally arranged in the buffer memory 4C. The control data $P_3$ 1 to $P_3$ 4 and CRC codes $CRC_3$ 1 to $CRC_3$ 4 for error detection are added to these data.

Figure 4D:
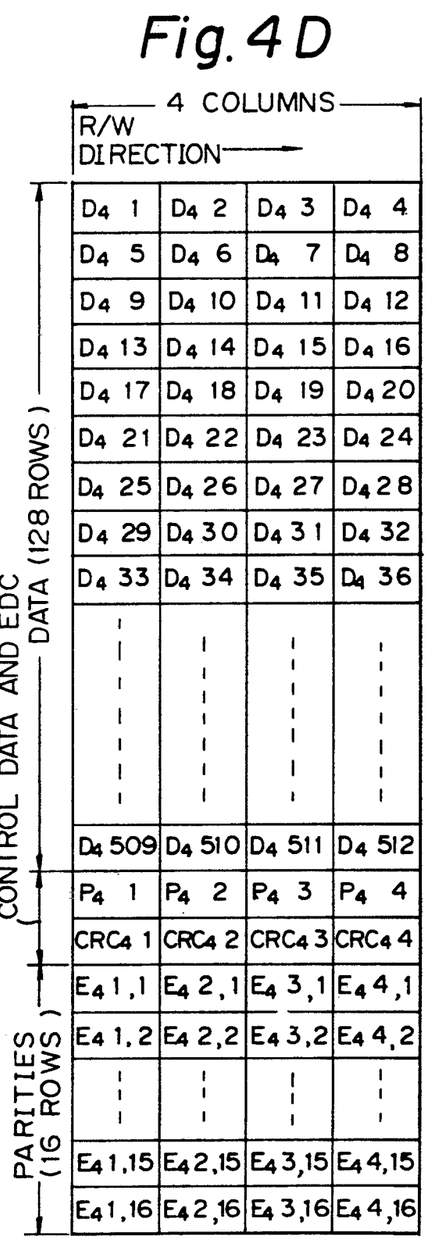

Finally, as shown in FIG. 4D, the data $D_4$ 1 to $D_4$ 512 are two-dimensionally arranged in the buffer memory 4D. Control data $P_4$ 1 to $P_4$ 4 and CRC codes $CRC_4$ 1 to $CRC_4$ 4 for error detection are added to these data.

Figure 3:
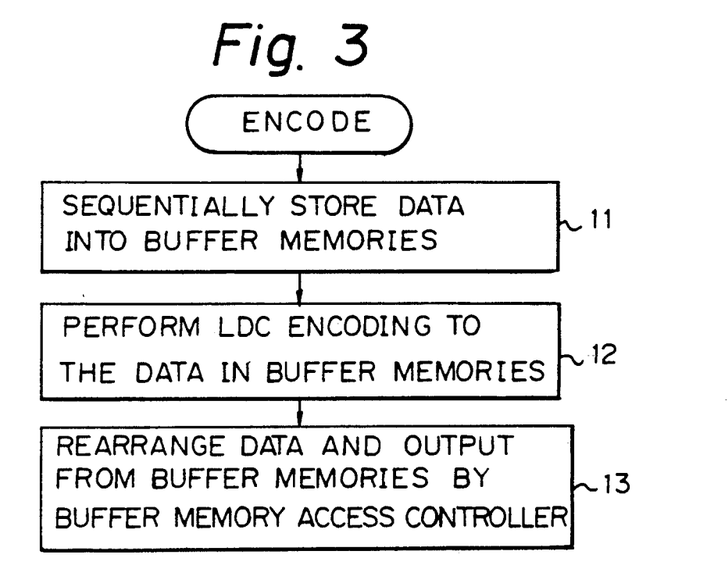
FIG. 3 is a flowchart which is used in explanation of the encoding in the embodiment of the invention depicted in FIG. 1.

As shown in FIGS. 4A to 4D, error correction codes are generated and added to the two dimensionally arranged data by the encoding/decoding circuit 3 by using each column as an encoding series (step 12 of FIG. 3).

That is, 16-byte parity codes $E_1$ 1,1 to $E_1$ 1,16, $E_1$ 2,1 to $E_1$ 2,16, $E_1$ 3,1 to $E_1$ 3,16, and $E_1$ 4,1 to $E_1$ 4,16 for error correction are generated and added to each of the respective columns of the encoding block shown in FIG. 4A.

Similarly, 16-byte parity codes $E_2$ 1,1 to $E_2$ 1,16, $E_2$ 2,1 to $E_2$ 2,16, $E_2$ 3,1 to $E_2$ 3,16, and $E_2$ 4,1 to $E_2$ 4,16 for error correction are generated and added to each of the respective columns of the encoding block shown in FIG. 4B.

Parity codes $E_3$ 1,1 to $E_3$ 1,16, $E_3$ 2,1 to $E_3$ 2,16, $E_3$ 3,1 to $E_3$ 3,16, and $E_3$ 4,1 to $E_3$ 4,16 for error correction of 16 bytes are generated and added to each of the respective columns of the encoding block shown in FIG. 4C.

Finally, 16-byte parity codes $E_4$ 1,1 to $E_4$ 1,16, $E_4$ 2,1 to $E_4$ 2,16, $E_4$ 3,1 to $E_4$ 3,16, and $E_4$ 4,1 to $E_4$ 4,16 for error correction are generated and added to each of the respective columns of the encoding block shown in FIG. 4D.

As shown in FIGS. 4A to 4D, by adding the 16 rows of parity codes for error correction to each column, error correction can be performed for up to eight bytes per one series.

The data in the buffer memories 4A to 4D is read out under the control of the buffer memory access controller 5 and is output from the input/output terminal 2 and is recorded onto the disc 6. At this time, the reading operations of the buffer memories 4A to 4D are controlled by the buffer memory access controller 5 so that the interleave length becomes substantially long (step 13 of FIG. 3).

That is, for instance, when one data is read out of the buffer memory 4A, one data is then read out of the buffer memory 4B. Next, one data is read out of buffer memory 4C and one data is sequentially read out of the buffer memory 4D. By alternately reading out the data from the four buffer memories 4A to 4D as mentioned above, the sequence of the data is rearranged and the data is recorded in the physical sectors $S_1$ to $S_4$ on the disc 10 as shown in FIGS. 5A to 5D.

Figure 5A:
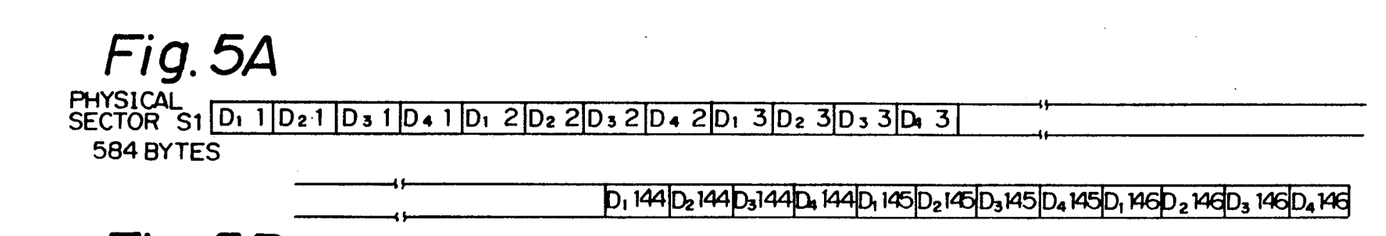
FIGS. 5A, 5B, 5C and 5D are schematic diagrams which are used in explanation of the recording of data in each sector in the embodiment of the invention depicted in FIG. 1.

That is, as shown in FIG. 5A, the data is sequentially recorded into the physical sector $S_1$ in accordance with the sequence of the data $D_1$ 1, $D_2$ 1, $D_3$ 1, $D_4$ 1, $D_1$ 2, $D_2$ 2, $D_3$ 2, $D_4$ 2, . . . . and so forth until the data $D_1$ 146, $D_2$ 146, $D_3$ 146 and $D_4$ 146 so that data comprising 584 bytes is recorded.

Figure 5B:
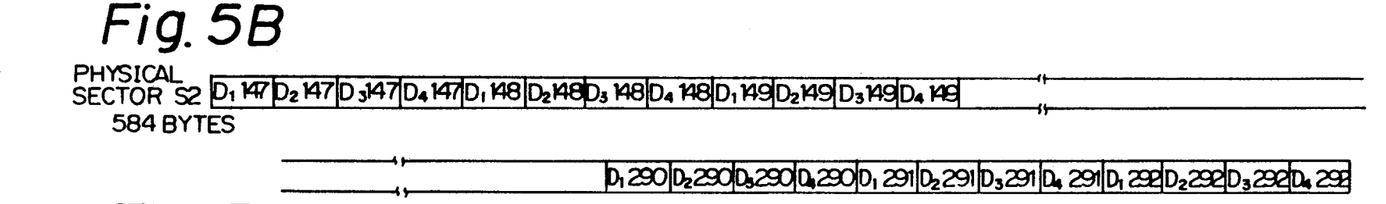

As shown in FIG. 5B, the data is sequentially recorded into the physical sector $S_2$ in accordance with the sequence of the data $D_1$ 147, $D_2$ 147, $D_3$ 147, $D_4$ 147, $D_1$ 148, $D_2$ 148, $D_3$ 148, $D_4$ 148, . . . . and so forth until the data $D_1$ 292, $D_2$ 292, $D_3$ 292, and $D_4$ 292 so that data comprising 584 bytes is recorded.

Figure 5C:
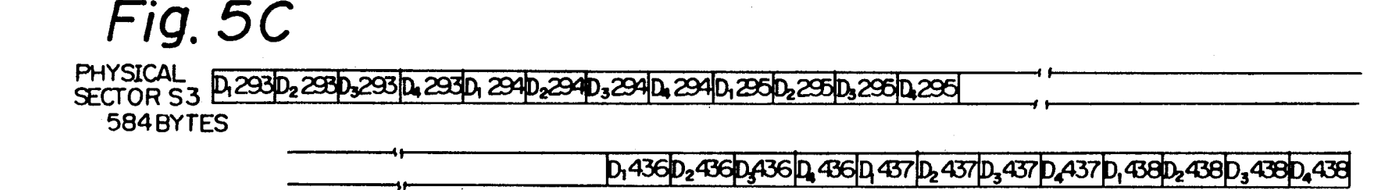

As shown in FIG. 5C, the data is sequentially recorded into the physical sector $S_3$ in accordance with the sequence of the data $D_1$ 293, $D_2$ 293, $D_3$ 293, $D_4$ 293, $D_1$ 294, $D_2$ 294, $D_3$ 294, $D_4$ 294, . . . and so forth until the data $D_1$ 438, $D_2$ 438, $D_3$ 438 and $D_4$ 438 so that data comprising 584 bytes is recorded.

Figure 5D:
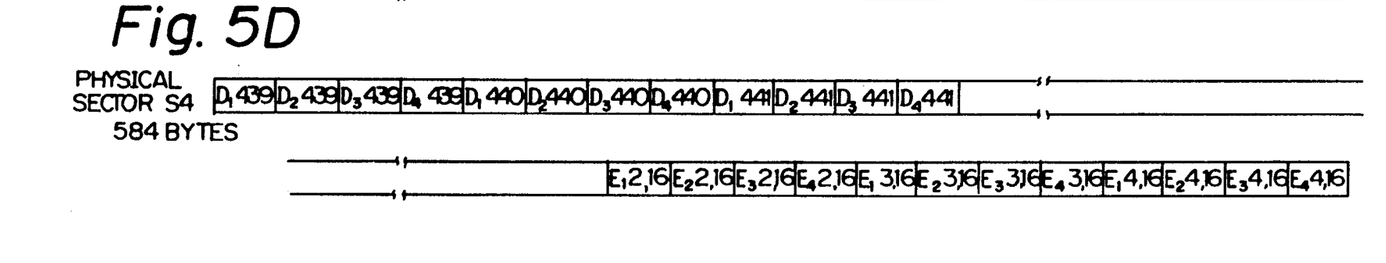

As shown in FIG. 5D, the data is sequentially recorded into the physical sector $S_4$ in accordance with the sequence of the data $D_1$ 439, $D_2$ 439, $D_3$ 439, $D_4$ 439, $D_1$ 440, $D_2$ 440, $D_3$ 440, $D_4$ 440, . . . and so forth until the data $E_1$ 4,16, $E_2$ 4,16, $E_3$ 4,16 and $E_4$ 4,16 so that data comprising 584 bytes is recorded.

By recording the data onto the disc 6 by this rearranging method, the interleave length is substantially increased four times as compared with that in the case where the data is not rearranged.

That is, as shown in FIGS. 4A to 4D, by arranging the data at four columns and adding parities for error correction of 16 bytes to every column, error correction of up to eight bytes per one series can be executed. In the case where the data is not rearranged, an interleave of four bytes is performed. Therefore, in the case where the data stored in the buffer memories 4A to 4D is recorded into the corresponding physical sectors on the disc 6 without rearranging the data, it is possible to cope with burst errors of only up to $8 \times 4 = 32$ bytes.

On the other hand, when the data is rearranged and recorded onto the disc 6 as mentioned above, the interleave length is further increased four times. Therefore, it is possible to cope with burst errors of up to $4 \times 32 = 128$ bytes.

Figure 6A:
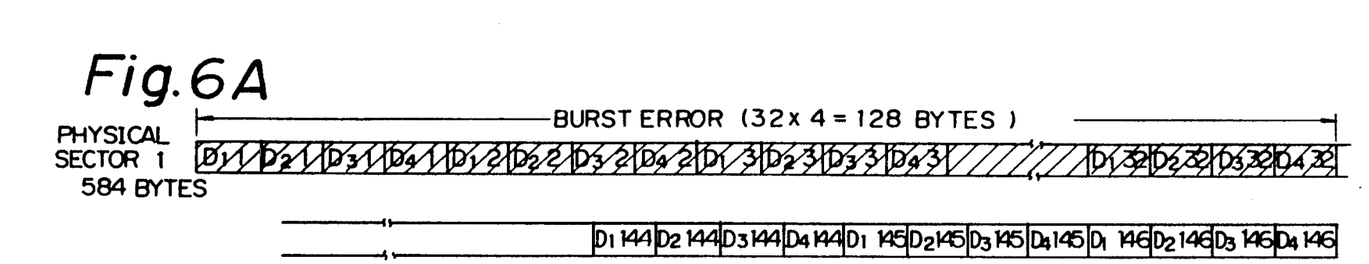
FIGS. 6A, 6B, 6C, 6D and 7A, 7B, 7C, and 7D are schematic diagrams which are used in explanation of the embodiment of the invention depicted in FIG. 1.
Figure 6B:
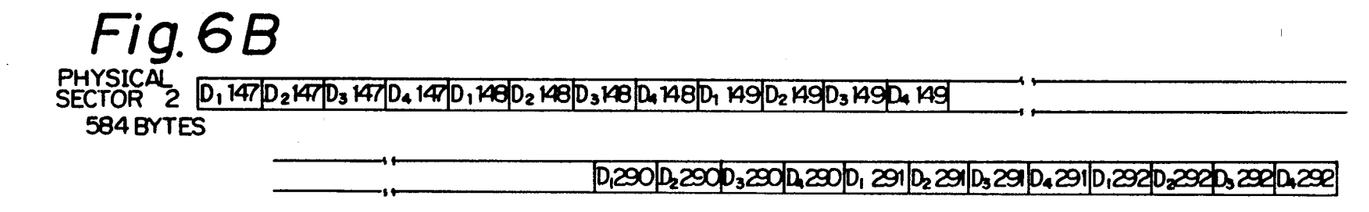
Figure 6C:
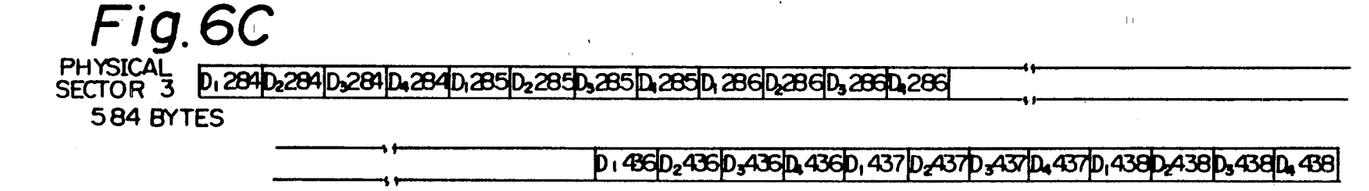
Figure 6D:
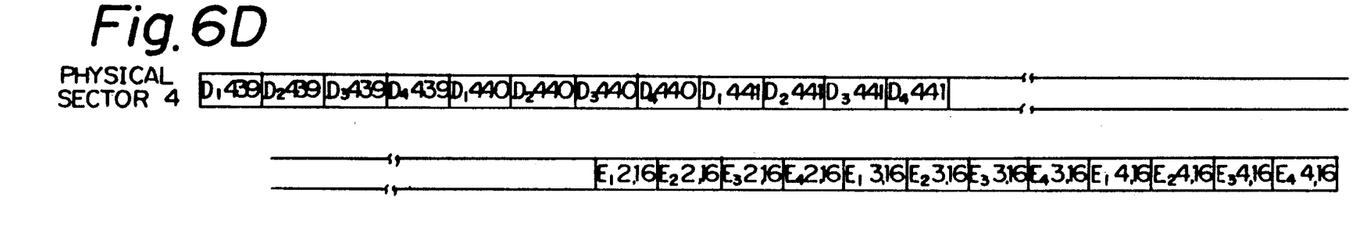
Figure 7A:
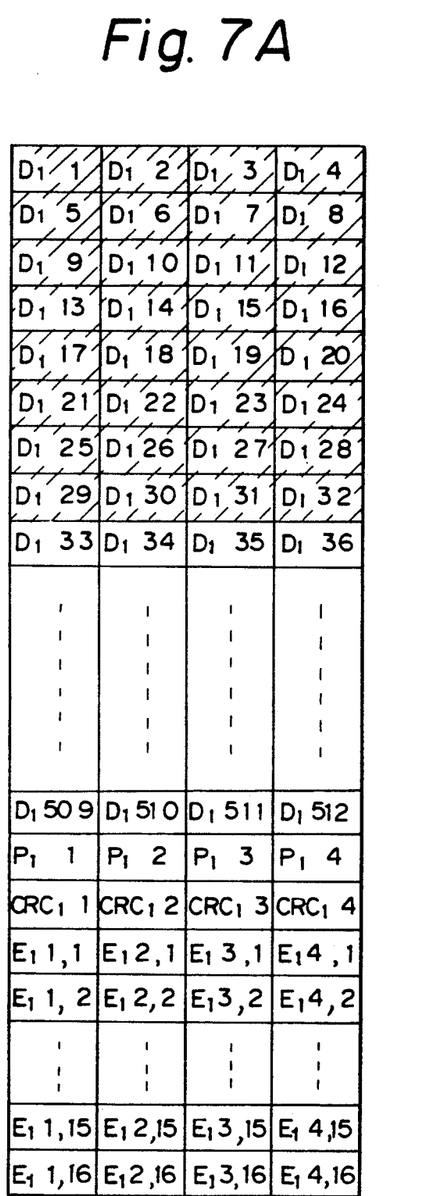
Figure 7B:
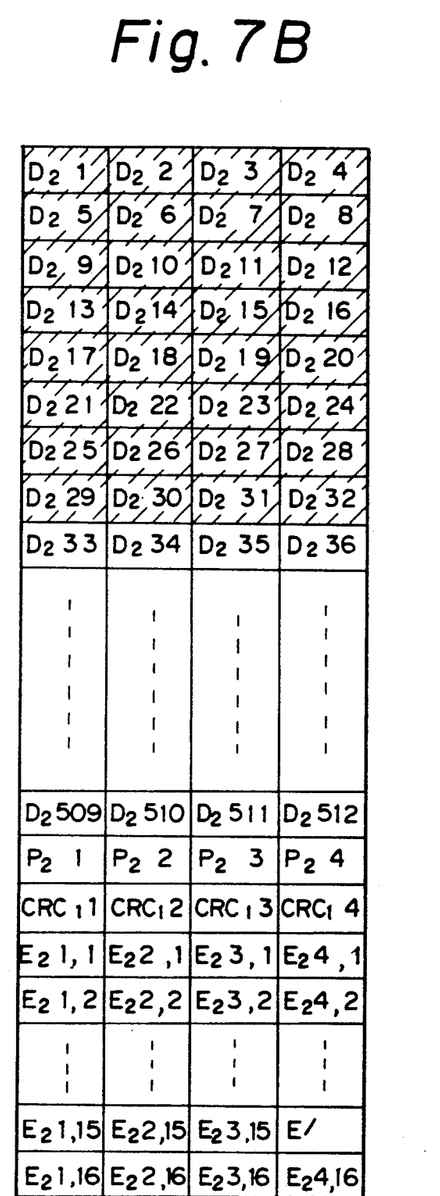
Figure 7C:
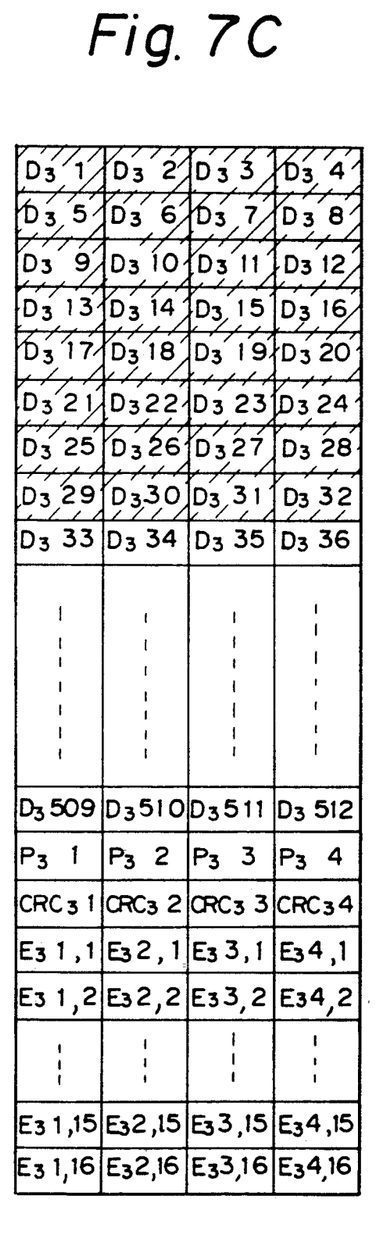
Figure 7D:
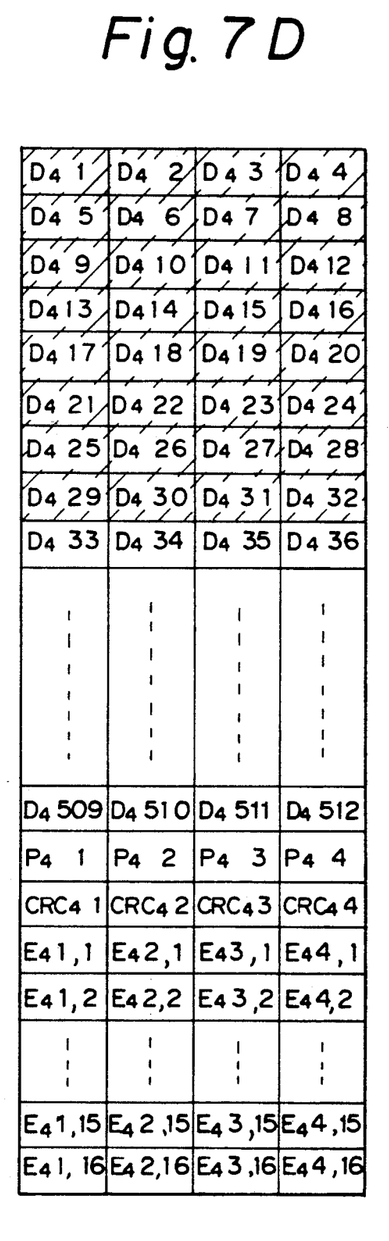

For instance, assume that defects occurred on the disk 6 in the data recording areas of 128 bytes, for example, in the data $D_1$ 1 to $D_4$ 32 in the physical sector $S_1$ 1 shown as hatched portions in FIG. 6A. In this case, as shown by hatched portions in FIGS. 7A to 7D, the errors are generated in the data of the first to eight rows in each encoding block. Since the error correction codes of 16 bytes have been added to each column in each of the encoding blocks of FIGS. 7A to 7D, error correction of up to eight bytes in each encoding series can be executed. Thus, all of the errors which were generated at that time can be corrected.

The operation during data reproduction will now be described. The operation upon reproduction is opposite to that upon recording mentioned above.

Figure 8:
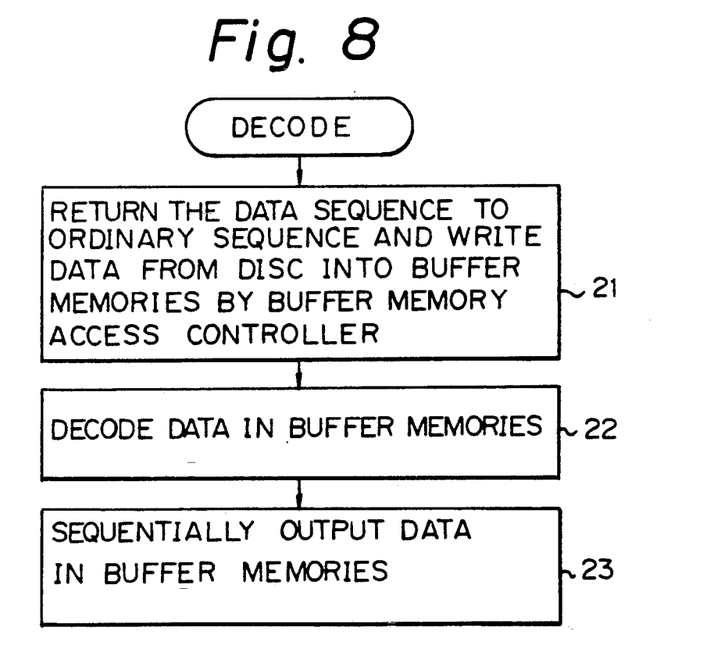
FIG. 8 is a flowchart which is used in explanation upon decoding in the embodiment of the invention depicted in FIG. 1.
Figure 9A:
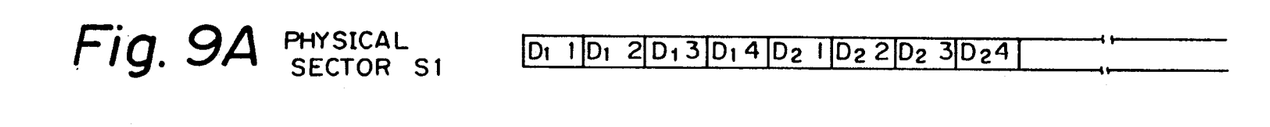
FIGS. 9A, 9B, 9C, and 9D are schematic diagrams which is used in explanation of another embodiment of the invention.
Figure 9B:
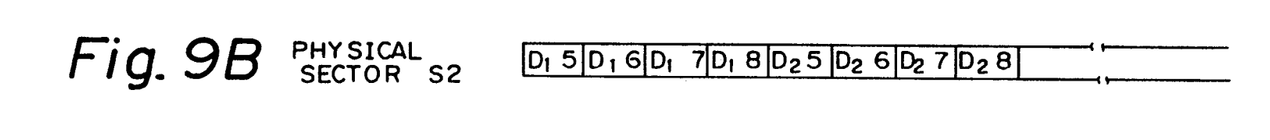
Figure 9C:
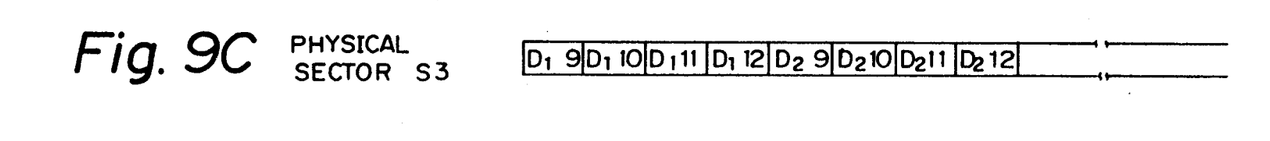
Figure 9D:
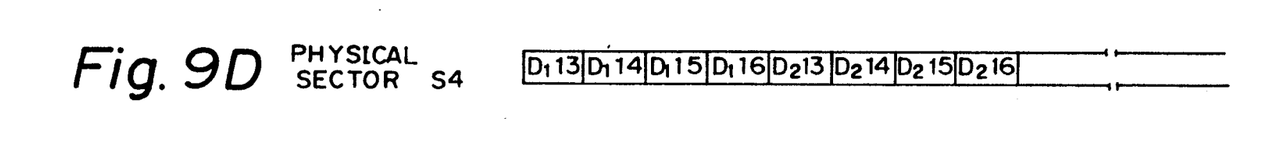

That is, as shown in the flowchart of FIG. 8, the data from the physical sectors $S_1$ to $S_4$ on the disc 6 is sequentially reproduced. As mentioned above, the data has been rearranged and recorded in the physical sectors $S_1$ to $S_4$ on the disc 6.

This rearranged, reproduced data is input at the input/output terminal 2 and the sequence of the data is returned to the original sequence under the control of the buffer memory access controller 5 and the data is sequentially stored into the buffer memories 4A to 4D (step 21 of FIG. 8).

That is, the sequence of the reproduced data of the disc 6 based on the sequence as shown in FIGS. 5A to 5D is rearranged under the control of the buffer memory access controller 5. The data $D_1$ 1, $D_1$ 2, $D_1$ 3, $D_1$ 4, . . . is sequentially stored into the buffer memory 4A in the horizontal direction. The data $D_2$ 1, $D_2$ 2, $D_2$ 3, $D_2$ 4, . . . is sequentially stored into the buffer memory 4B in the horizontal direction. The data $D_3$ 1, $D_3$ 2, $D_3$ 3, $D_3$ 4, . . . is sequentially stored into the buffer memory 4C in the horizontal direction. The data $D_4$ 1, $D_4$ 2, $D_4$ 3, $D_4$ 4, . . . is sequentially stored into the buffer memory 4D in the horizontal direction. Thus, the reproduced data is returned to the original two-dimensional arrangement as shown in FIGS. 4A to 4D.

For the data stored in the buffer memories 4A to 4D, the error correcting process is executed by the encoding/decoding circuit 3 by using each column as an encoding series. As mentioned above, the error correction can be executed for up to eight bytes by such an error correcting process by each encoding series. Therefore, it is possible to cope with burst errors of up to 128 bytes (step 22 of FIG. 8).

The data which was error correction processed is sequentially read out of the buffer memories 4A to 4D and output from the input/output terminal 1 (step 23 of FIG. 8).

In the preferred embodiment, as shown in FIGS. 5A to 5D, the data is rearranged in accordance with the sequence of the data $D_1$ 1, $D_2$ 1, $D_3$ 1, $D_4$ 1, $D_1$ 2, $D_2$ 2, $D_3$ 2, $D_4$ 2, . . . . However, the rearranging method of data is not limited to this manner. It is possible to use any rearranging method such that the interleave length becomes substantially long.

For instance, as shown in FIGS. 9A to 9D, the data $D_1$ 1, $D_1$ 2, $D_1$ 3 and $D_1$ 4 of the first row in the encoding block in FIG. 4A is recorded into the physical sector $S_1$, the data $D_1$ 5, $D_1$ 6, $D_1$ 7 and $D_1$ 8 of the second row is recorded into the physical sector $S_2$, the data $D_1$ 9, $D_1$ 10, $D_1$ 11 and $D_1$ 12 of the third row is recorded into the physical sector $S_3$, and the data $D_1$ 13, $D_1$ 14, $D_1$ 15 and $D_1$ 16 of the fourth row is recorded into the physical sector $S_4$. It is possible to execute the rearrangement as mentioned above.

In the above embodiment, the input data is divided into four encoding blocks by the four buffer memories 4A to 4D and encoded and the data rearrangement is performed among the four encoding blocks. However, the number of encoding blocks is not limited to four. For instance, it is also possible to divide the input data into two encoding blocks and to execute the data rearrangement between the two encoding blocks. By executing the data rearrangement between the two encoding blocks as mentioned above, the interleave length can be substantially doubled. The number of encoding blocks into which the input data is divided is determined in consideration of the length of the burst errors which will be generated in the disc and the capacities of the buffer memories which can be realized. The information indicative of the number of encoding blocks which were divided can be written as a flag onto a control track or into an ID section of each sector.

The invention is not limited to the LDC but can be also similarly applied to the case of using a product code.

According to the invention, the data which was divided into, for instance, four encoding blocks and encoded is recorded into each sector on the disc by rearranging the data sequence. By executing the data rearrangement among a plurality of encoding blocks, the interleave length becomes substantially long and the error correcting capability for burst errors can be increased.

Having described a specific preferred embodiment of the present invention with reference to the accompanying drawings, it is to be understood that the invention is not limited to that precise embodiment, and that various changes and modifications can be effected therein by one skilled in the art without departing from the scope or the spirit of the invention as defined in the appended claims.

What is claimed is:

1. A method for recording digital data onto a disc-shaped recording medium having a sector construction, comprising the steps of:

receiving input digital data and dividing it into predetermined lengths;

two-dimensionally arranging the predetermined lengths of the divided digital data into n separate arrays, each array having rows and columns, where n is an integer greater than one;

for each array, generating separate error correction codes and adding the separate error correction codes to the columns of the array and storing each of the n arrays of digital data and error correction codes at different addresses in a digital memory means; and sequentially reading out the digital data and error correction codes from the digital memory means and recording the read out digital data and error correction codes to each sector in series on the disc-shaped recording medium, wherein the step of reading out the digital data and error correction codes follows a sequence that the digital data or error correction code at any given set of row and column coordinates in a first one of the n arrays is read out and recorded, followed by reading out and recording the digital data or the error correction code at the same given set of row and column coordinates in a second one of the n arrays, followed by reading out and recording the digital data or error correction code at the same given set of row and column coordinates in a third and each subsequent one of the n arrays.

2. A digital data recording method according to claim 1, wherein the step of reading out the digital data and error correction codes is performed in a manner such that the digital data and error correction codes are read out from the digital memory means in a direction of the rows of the n arrays and recorded on the recording medium.

3. A method for recording digital data onto a disc-shaped recording medium having a sector construction, comprising the steps of:

sequentially taking input digital data, m bytes at a time, where m is an integer, and sequentially storing each successive group of m bytes of input digital data as a separate array of rows and columns into a digital memory means;

generating separate error correction codes for each array and adding the error correction codes as additional rows of each of the arrays in the digital memory means; and sequentially reading out the input digital data and the error correction codes from a series of corresponding row and column positions in each of the arrays, thereby rearranging the sequence of the input digital data and error correction codes, and recording the rearranged sequence of input digital data and error correction codes in the sectors on the disc-shaped recording medium.

4. A digital data recording method according to claim 3, wherein m equals 512 bytes.

5. A input digital data recording method according to claim 3, wherein the input digital data of each array is arranged into four columns and 16 bytes of parities are added to every array column.

6. A input digital data recording method according to claim 3, wherein the input digital data is written into each array in the row direction.

7. A input digital data recording method according to claim 3, further comprising the step of:

with respect to each array, before the generation of the error correction codes, generating a separate cyclic redundancy code (CRC) for each array and adding the separate cyclic redundancy code to the array for purposes of facilitating error detection.

* * * * *